Feb. 4, 1941.   F. J. BINGLEY   2,230,926
TIMING SIGNAL CIRCUITS
Filed April 13, 1939   2 Sheets-Sheet 1

Inventor:-
Frank J. Bingley
by his Attorneys
Howson & Howson

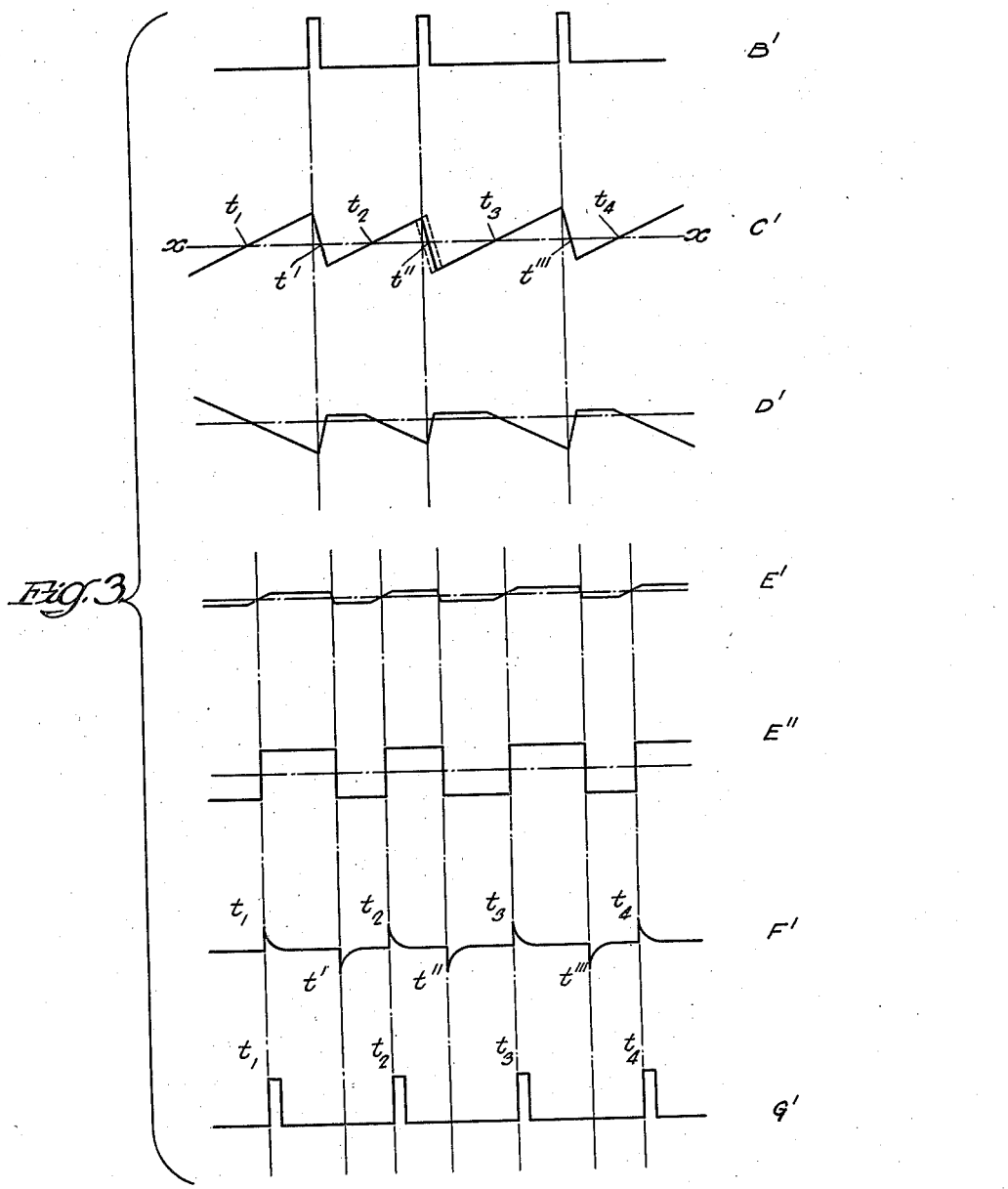

Patented Feb. 4, 1941

2,230,926

UNITED STATES PATENT OFFICE 2,230,926

TIMING SIGNAL CIRCUITS

Frank J. Bingley, Mount Airy, Pa., assignor, by mesne assignments, to Philco Radio and Television Corporation, Philadelphia, Pa., a corporation of Delaware Application April 13, 1939, Serial No. 267,686

10 Claims. (Cl. 250—36)

This invention relates to devices for forming timing signals of great accuracy, and provides circuits for minimizing variations in the frequency or rate of occurrences which may be present in such signals. This application is a continuation in part of co-pending application, Serial No. 51,324, filed November 23, 1935, now Patent No. 2,171,536, granted September 5, 1939, which describes a complete television system including certain means which contemplate the removal of periodic variations in frequency which may be present in the timing signal source. In accordance with the present invention, there are disclosed new and improved means for effecting further reductions in such frequency variations, and these means may be advantageously employed either in conjunction with the system of the said copending application, or in any other system requiring a source of pulse signals accurately and evenly spaced in time. Systems in which such signals are advantageously employed are described in the said co-pending application and therefore need not be described in the present application.

The principal object of this invention is to provide circuits capable of supplying accurately timed periodic impulses from a source which may be subject to periodic or random variations in frequency.

Figure 2:
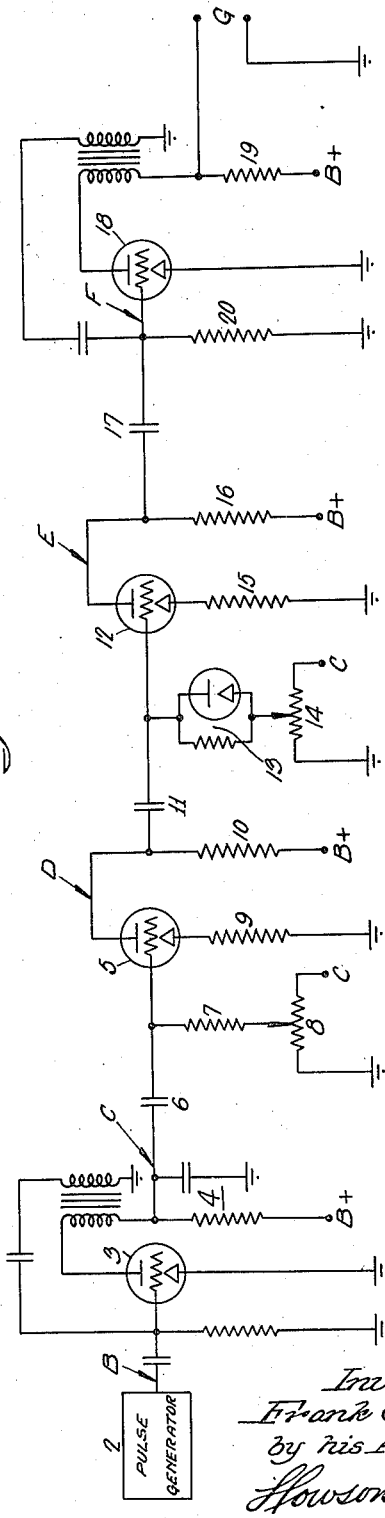

Other objects and features of the invention will become apparent hereinafter. For a clear understanding of the manner in which the objects of the invention are achieved, reference may be had to the accompanying drawings, in which Fig. 1 is a simple block diagram illustrating the apparatus of the present invention;

Fig. 2 is a diagrammatic illustration of a preferred embodiment of the invention; and Fig. 3 illustrates the various signals occurring at different points in the system of Fig. 2 and also illustrates the method of obtaining accurately timed impulses according to the invention.

Figure 1:
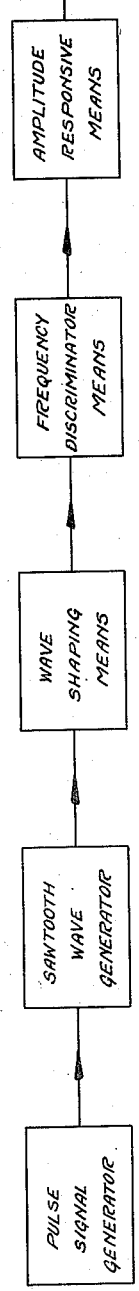

Referring to Fig. 1, there are illustrated in block form the principal elements of the system provided by the present invention. As illustrated, the signals from a pulse signal generator or source are fed to a sawtooth wave generator, and the sawtooth wave produced thereby is supplied to wave shaping means to alter the wave form. The altered wave is supplied to a frequency discriminator means which forms accurately spaced pulses. The latter may be employed per se or may be supplied to an amplitude responsive means to produce corresponding accurately timed pulses.

The elements of the system are shown in detail in Fig. 2 and the successive signals are illustrated in Fig. 3, which figures will now be discussed in detail.

Referring now to Fig. 2, it may be stated that this figure discloses a circuit which corresponds generally to, and constitutes an improvement over, that shown in Fig. 17 of the above-mentioned co-pending application. The pulse generator 2 may be any suitable source of timing signals, such as that provided by the combination of a light-chopper disc and photo-cell conversion equipment, or it may comprise the synchronizing signal generator described in the above-mentioned co-pending application. The timing signals from source 2, which appear at point B, may be of a comparatively simple wave-shape, or of a generally rectangular form such as those illustrated at B' in Fig. 3. Due, however, to certain inherent limitations, the timing signals derived from such pulse generators are normally not exactly evenly spaced in time relation, as illustrated at B' in Fig. 3, and are unsuitable for use in systems which require high degrees of precision in their timing or synchronizing circuits, as is the case in modern high fidelity television, and particularly in the case of the higher frequency synchronizing signals where slight time misplacements will cause the picture to have ragged uneven edges with corresponding distortion of the picture. The time misplacement in light-chopper disc systems is present even when the rotational velocity of the disc is held perfectly constant, and may be due to an uneven spacing of the holes which cannot be entirely prevented even by the most precise workmanship, to the collection of dirt in the apertures, or to vibration of the light source, photocell, chopperdisc, or related equipment. In electronic synchronizing generator systems, the difficulty is frequently due to slight amplitude and/or frequency modulation.

According to the present invention, the unevenly spaced timing pulses B', which appear at point B, are applied to the control grid of a suitable sawtooth wave generator, such as the blocking tube oscillator 3, by which means a sawtooth wave of voltage C' (see Fig. 3) may be derived from the point C which is common to the resistance-capacitance combination 4. The potential across the circuit 4 increases as the condenser charges during quiescent or inoperative periods of the intermittently operative device 3, and the said potential decreases (as the condenser discharges) during the operative periods of device 3. In the aforementioned application, the characteristics of sawtooth waves generated in this manner have been fully discussed, and therefore only the conclusions therein arrived at will be herein set forth. Thus, it was shown that while the discharge portions of the sawtooth wave (having the steeper slope) which occur in synchronism with the pulses B' may be unevenly spaced along an arbitary time axis (X—X for example), the charging portions of the wave (having the lesser slope) will cross the axis after equal intervals of time. Therefore, while the points $t'$, $t''$, and $t'''$ may be unevenly spaced, due to inaccuracies in the timing pulses B', the points $t_1$, $t_2$, $t_3$ and $t_4$ are separated by substantially equal intervals of time. Thus, so long as the magnitude and rate of the discharge is substantially constant it will be seen to be immaterial whether such discharge occurs, for example, at the time $t''$ or slightly before or after this time as shown by the dotted lines, for the position of the points $t_2$ and $t_3$ are independent of the exact positioning of the time $t''$. Stated differently it may be said that in order to secure substantially evenly spaced points of inter-section between an arbitrary time axis and the charging portions of a wave of the form illustrated, it is necessary that the wave fronts of the discharge portions of the wave be of substantially constant amplitude. The converse is likewise true, viz., in order to secure substantially evenly spaced points of intersection between an arbitrary time axis and the discharge portions of a wave of the form described, it is necessary that the wavefronts of the charging portions of the wave be of substantially constant amplitude.

It is understood, of course, that the invention is not limited to the specific form of oscillator shown at 3, since many forms of such oscillators are well known and may be employed with like effect, for example, those employing gas triodes or the like. Broadly stated the oscillator may be any device capable of generating a generally sawtooth-shaped wave, one of whose wave fronts is of a constant amplitude.

In the hereinbeforementioned co-pending application, this sawtooth wave was applied to the control grid of a second blocking tube oscillator whose cycle was initiated each time the sawtooth voltage wave exceeded a predetermined threshold value, e. g., that denoted by the arbitrary level X—X; and this process could be repeated any desired number of times, each resulting in an increased degree of accuracy in pulse spacing. It has been found, however, that the relatively low slope of the charging portion of the wave (that passing through the points $t_1$, $t_2$, etc.) tends to limit the precision of the system, since the voltage level at which the cycle may be initiated may vary slightly from cycle to cycle whereby the institution of the oscillations may occur either shortly before or after the times $t_1$, $t_2$, etc.

According to the present invention, the sawtooth wave C' is passed through suitable wave shaping networks whereby the wave is altered to give a steeper wave front, and hence more positive control action, at the points corresponding to $t_1$, $t_2$, etc. This may be accomplished as follows: The sawtooth wave is impressed on the grid of an amplitude limiting device 5 which may be a triode provided with a means, such as the potentiometer 8, for varying the cut-off level of the triode. Although not necessarily, the triode is preferably provided with a cathode load 9 in addition to the plate load 10 in order to sharpen its cut-off characteristic. The cathode load also has the desirable property of straightening that part of the characteristic which lies above the cut-off point, with the added advantage of minimizing the possibility of over-loading by increasing the grid voltage swing which the tube can handle.

The resulting wave, limited, and reversed in polarity, which appears in the plate circuit D is shown at D' in Fig. 3. This wave is in turn impressed on a similar limiting device 12 and appears in the plate circuit E as the symmetrically limited wave E' (see Fig. 3), again reversed in polarity with respect to the wave D'. A leveling circuit, including the resistor and diode combination 13, may be employed, if desired, in place of a simple grid resistance. As will be understood by those skilled in the art, the effect of such a leveling circuit is to maintain the flat part of the wave at a desired voltage level.

It will be seen that the passage of the wave C' through the limiting circuits has provided a wave E' which is actually a thin section or slice of wave C' taken along some arbitrary and more or less centrally located axis X—X. If this section is made very thin a substantially rectangular wave results such as that shown at E'' in which representation of the voltage scale has been amplified or exaggerated with respect to the time axis. It should be borne in mind, with respect to the wave E'', that the wave fronts rising in the positive direction are accurately spaced in time, corresponding to the points $t_1$, $t_2$, etc., of the wave C', while those portions which fall in a negative direction are inaccurately spaced and correspond to the points $t'$, $t''$, etc. of the wave C'.

If now the wave E'' be passed through a network having a relatively good high frequency response, but a poor low frequency response, a wave-form may be obtained such as that shown at F'' wherein the positive impulses are accurately spaced, while the negative impulses $t'$, $t''$, etc. carry the periodic error. Such a frequency selective network may be simply provided by such means as the coupling condenser 17 and the resistor 20. Thus the wave F' appears at point F.

The accurately spaced positive pulses $t_1$, $t_2$, etc. may then be employed per se, or may be used to synchronize a second blocking tube oscillator 18 which may be designed to provide an output waveform at the terminals G, such as that shown at G', whose pulses $t_1$, $t_2$, etc. will be substantially evenly spaced in time even though the initiating pulses of the wave B' may contain comparatively large periodic errors in spacing. Thus, the device 18 constitutes an amplitude responsive means which discriminates between the accurately spaced pulses and the inaccurately spaced pulses of signal F''.

If even greater accuracy is desired, the process above described may be repeated, for example, by connecting to the terminals G a second system similar to that just described, or preferably by shunting the resistor 19 with a condenser such as is employed at 4 in the first oscillator 3, and then coupling to the terminals G a system comprising units similar to those shown to the right of the condenser 6 in the figure. If it is desired to provide a bi-phase source of the accurately spaced signals, the method described in the said co-pending application may, of course, be employed. Many other variations are, of course, possible within the scope of the invention, the invention having been herein illustrated in specific form for the purpose of disclosure, and with no intention of limitation thereto.

I claim:

1. In an electrical system, a source of input signals having a mean period, some of the cycles of said signals having individual periods which deviate from the mean period of said input signals, a circuit having a voltage service connected thereto for establishing a potential thereacross, intermittently operative means connected to said source, the operative period of said means being initiated by said input signal for decreasing the amplitude of said potential during a predetermined time interval by an amount dependent at least in part upon the duration of said time interval, means for increasing the amplitude of said potential whenever said first means is inoperative, said potential increase and potential decrease causing said potential to oscillate about a level to form a sawtooth signal, wave shaping means for altering the wave shape of said potential, and frequency discriminating means responsive to said altered potential for forming an output signal having a period more nearly equal to said mean period of said input signal than the period of said initiating input signal cycle.

2. In an electrical system, a source of input signals having a mean period, some of the cycles of said signals having individual periods which deviate from the mean period of said input signals, a circuit having a voltage source connected thereto for establishing a potential thereacross, intermittently operative means connected to said source, the operative period of said means being initiated by said input signal for decreasing the amplitude of said potential during a predetermined time interval by an amount dependent at least in part upon the duration of said time interval, means for increasing the amplitude of said potential whenever said first means is inoperative, said potential increase and potential decrease causing said potential to oscillate about a level to form a sawtooth signal, wave shaping means for altering the wave shape of said potential, frequency discriminating means for forming a still further altered potential, and amplitude responsive means responsive to said further altered potential for forming an output signal whenever said further altered potential exceeds the threshold level of said amplitude responsive means, said output signal having a period more nearly equal to said mean period of said input signal than the period of said initiating input signal cycle.

3. In an electrical system, a source of synchronizing signals having a mean period, some of the cycles of said signals having individual periods which deviate from said mean period, a blocking tube oscillator, means for synchronizing the operation of said oscillator with said synchronizing signals, whereby the discharge portions of the output waveform of said oscillator exhibit deviations corresponding to the deviations of said synchronizing signals from the mean period, wave shaping means for altering the output waveform of said oscillator, and frequency discriminating means responsive to said altered waveform for forming an output having a period more nearly equal to said means period of said synchronizing signals than the actual period of said synchronizing signals.

4. In an electrical system, a source of synchronizing signals having a mean period, some of the cycles of said signals having individual periods which deviate from said mean period, a blocking tube oscillator, means for synchronizing the operation of said oscillator with said synchronizing signals, whereby the discharge portions of the output waveform of said oscillator exhibit deviations corresponding to the deviations of said synchronizing signals from the mean period, wave shaping means for altering the output waveform of said oscillator, frequency discriminating means for forming a still further altered waveform, and amplitude responsive means responsive to said further altered waveform for forming an output signal whenever said further altered potential exceeds the threshold level of said amplitude responsive means, said output signal having a period more nearly equal to said mean period of said synchronizing signals than the actual period of said synchronizing signals.

5. In an electrical system, a source of synchronizing signals having a mean period, some of the cycles of said signals having individual periods which deviate from said mean period, a blocking tube oscillator, an output circuit for said oscillator, means for deriving a potential of a generally sawtooth waveform therefrom, means for synchronizing the operation of said oscillator with said synchronizing signals, whereby the discharge portions of said sawtooth waveform exhibit deviations corresponding to the deviations of said synchronizing signals from the mean period, amplitude limiting means for transferring only a more or less centrally located portion of said sawtooth wave lying between two predetermined amplitude levels, frequency discriminating means for forming a further altered waveform, and amplitude responsive means responsive to said further altered waveform for forming an output signal whenever said further altered potential exceeds the threshold level of said last-mentioned amplitude responsive means, said output signal having a period more nearly equal to said mean period of said synchronizing signals than the actual period of said synchronizing signals.

6. In an electrical system, a source of synchronizing signals having a mean period, some of the cycles of said signals having individual periods which deviate from said mean period, means for generating a sawtooth wave one of whose wavefronts is of constant amplitude, means for synchronizing the operation of said sawtooth wave generator with said synchronizing signals, amplitude limiting means for suppressing both the positive and negative peaks of said sawtooth wave whereby only a more or less centrally located section of said sawtooth wave lying between two predetermined amplitude levels is transferred, said limited and centrally located wave section being of a generally rectangular wave shape, said rectangular wave having alternate wave fronts equally spaced and the other alternate wave fronts unequally spaced, high-pass filter means for deriving pulses corresponding in time to the wavefronts of said rectangular wave, and means for discriminating between the equally and unequally spaced pulses thus derived.

7. In an electrical system, a source of synchronizing signals having a mean period, some of the cycles of said signals having individual periods which deviate from said mean period, means for generating a sawtooth wave one of whose wavefronts is of constant amplitude, means for synchronizing the operation of said sawtooth wave generator with said synchronizing signals, amplitude limiting means for suppressing both the positive and negative peaks of said sawtooth wave whereby only a more or less centrally located section of said sawtooth wave lying between two predetermined amplitude levels is transferred, said limited and centrally located wave section being of a generally rectangular wave shape, said rectangular wave having alternate wave fronts equally spaced and the other alternate wave fronts unequally spaced, a leveling circuit comprising a diode and a resistor connected to said amplitude limiting means whereby the flat part of said limited wave section is maintained at a desired voltage level, high-pass filter means for deriving pulses corresponding in time to the wavefronts of said rectangular wave, and means for discriminating between the equally and unequally spaced pulses thus derived.

8. In an electrical system, a source of synchronizing signals having a mean period, some of the cycles of said signals having individual periods which deviate from said mean period, a blocking tube oscillator, an output circuit for said oscillator, means for deriving a potential of a generally sawtooth waveform therefrom, means for synchronizing the operation of said oscillator with said synchronizing signals whereby the discharge portions of said sawtooth waveform exhibit deviations corresponding to the deviations of said synchronizing signals from the mean period, amplitude limiting means for transferring only a more or less centrally located portion of said sawtooth wave lying between two predetermined amplitude levels, said centrally located portion of said wave being of a generally rectangular wave shape, said rectangular wave having alternate wave fronts equally spaced and the other alternate wave fronts unequally spaced, high-pass filter means for deriving pulses corresponding in time to the wave fronts of said rectangular wave, and means for discriminating between the equally and unequally spaced pulses thus derived.

9. In an electrical system, a source of synchronizing signals having a mean period, some of the cycles of said signals having individual periods which deviate from said mean period, means for generating a sawtooth wave one of whose wavefronts is of constant amplitude, means for synchronizing the operation of said sawtooth wave generator with said synchronizing signals, amplitude limiting means for suppressing both the positive and negative peaks of said sawtooth wave whereby only a more or less centrally located section of said sawtooth wave lying between two predetermined amplitude levels is transferred, said limited and centrally located wave section being of a generally rectangular wave shape, high-pass filter means for deriving pulses corresponding in time to the wave fronts of said rectangular wave, successive pulses being of opposite polarity, the pulses of only one polarity being substantially equally spaced along a time axis, and means responsive only to said equally spaced pulses for providing a source of timing signals of greater accuracy than that of said synchronizing signals.

10. In an electrical system, a source of synchronizing signals having a mean period, some of the cycles of said signals having individual periods which deviate from said mean period, means for generating a sawtooth wave one of whose wavefronts is of constant amplitude, means for synchronizing the operation of said sawtooth wave generator with said synchronizing signals, amplitude limiting means for suppressing both the positive and negative peaks of said sawtooth wave whereby only a more or less centrally located section of said sawtooth wave lying between two predetermined amplitude levels is transferred, said limited and centrally located wave section being of a generally rectangular wave shape, high-pass filter means for deriving pulses corresponding in time to the wavefronts of said rectangular wave, successive pulses being of opposite polarity, the pulses of only one polarity being substantially equally spaced along a time axis, a blocking tube oscillator, and means for supplying the pulses from said high pass filter means to the input circuit of said blocking tube oscillator to synchronize said oscillator, said oscillator being adjusted to synchronize only on pulses having the polarity of said substantially equally spaced pulses.

FRANK J. BINGLEY.